United States Patent [19]
Gatcomb

[11] Patent Number: 5,651,851
[45] Date of Patent: Jul. 29, 1997

[54] METHOD FOR MAKING INSULATED CONTAINER BLANK

[75] Inventor: James Gatcomb, Simsbury, Conn.

[73] Assignee: Sherwood Industries, Inc., Kensington, Conn.

[21] Appl. No.: 374,192

[22] Filed: Jan. 18, 1995

[51] Int. Cl.⁶ .................. B32B 31/00; B31B 1/25
[52] U.S. Cl. .................. 156/250; 156/252; 156/257; 156/277; 156/290; 493/53; 493/56; 493/59; 493/64; 493/83; 493/324; 493/340; 493/342; 493/370; 493/373
[58] Field of Search ............ 206/524.2; 220/412, 220/425, 608, 903; 428/34.2; 493/53, 56, 59, 64, 83, 320, 324, 340, 342, 370, 373, 906; 156/277, 278, 250, 257, 268, 290; 150/153, 252

[56] References Cited

U.S. PATENT DOCUMENTS 5,156,901  10/1992  Tanaka ..................... 428/182
5,203,761  4/1993  Reichental et al. ............ 493/346

*Primary Examiner*—Donald Loney
*Attorney, Agent, or Firm*—McCormick, Paulding & Huber

[57] ABSTRACT

A flat insulated container blank for forming the sidewall of a conventional insulated paper container made on a rotary turret single wrap cup making machine includes an inner layer of container stock, an intermediate layer of insulating material adhered to the container stock and an outer layer of label material. The blank is made from advancing webs of sheet material by a continuous form process.

14 Claims, 2 Drawing Sheets

5,651,851

1

METHOD FOR MAKING INSULATED CONTAINER BLANK

BACKGROUND OF THE INVENTION

This invention relates in general to disposable insulated containers and deals more particularly with a method for making a container blank for use in the manufacture of a disposable insulated container.

In recent years, rapid growth of the fast food industry has created an ever increasing demand for improved disposable insulated containers for serving hot and cold beverages and food products. Containers and cups made from expanded synthetic resin materials such as STYROFOAM, marketed by Dow Chemical Co., Midland, Mich., have enjoyed widespread popularity, because of their excellent thermal insulating characteristics. However, such cups and containers are not biodegradable or recyclable which has caused many communities and municipalities to adopt ordinances prohibiting the dispensing of food products in disposable containers made from such environmentally unfriendly materials. Such action has created an increased demand for improved disposable thermally insulated food containers made from materials which are biodegradable and can be recycled.

Multi-layered thermally insulated paper containers and cups of the type well known in the art have proven to be satisfactory substitutes for containers made from less desirable materials. Such insulated paper containers usually include two or three layers of paper which form the inner and outer sidewall surfaces of the container and define air spaces therebetween. Where three layers of material are employed the inner and outer layers often comprise separate blanks of container stock having a separately formed fluted or corrugated layer sandwiched therebetween. The intermediate layer and the outer layer are usually joined to the inner layer, which forms the inner sidewall of the cup, during the cup making operation. Since the plural layers of material which form the composite sidewall of the insulated cup are usually separately formed and united at the time of cup manufacture a considerable number of material handling operations are often required to bring the materials together which substantially increase the cost of container manufacture. When the cup sidewall is formed by uniting two layers of material to form the cup sidewall the outer layer is usually corrugated or fluted and cooperates with the inner layer to define air space therebetween. Separate operations are usually required to form the inner layer or cup sidewall blank and the fluted or corrugated outer layer. Special machinery may be required to prepare the corrugated or fluted blank which comprises the outer layer of the insulated cup, all of which adds substantially to the cost of cup manufacture.

Accordingly, it is the general aim of the present invention to provide an improved insulated container blank suitable for use in making an insulated cup on a conventional single wrap rotary turret cup making machine of a type well known in the disposable container manufacturing art.

SUMMARY OF THE INVENTION

In accordance with the present invention, an insulated container blank for use in the manufacture of a disposable insulated container comprises a layer of paper container stock having an exposed inner surface, a layer of insulating stock having an inner surface overlying and joined to an associated portion of the outer surface of the container stock, and a layer of label stock substantially complementing the layer of insulating stock and having an exposed outer surface and an inner surface overlying and married to the outer surface of the insulating stock. The layer of paper container stock, the layer of insulating stock and the layer of label stock cooperate in assembly to define a common side edge of the container blank. The layer of insulating stock and the layer of label stock have common top and bottom edges and another common side edge spaced inwardly from the associated top and bottom and other side edge of the layer of container stock. The composite container blank is made by advancing a web of label stock, simultaneously advancing a web of insulating stock, marrying the advancing web of label stock to the advancing web of insulating stock to form an advancing full laminate. The steps of manufacture further include cutting at least a part of a sidewall section from the full laminate, separating the scrap produced by the sidewall section cutting operation from the sidewall section, simultaneously advancing a web of container stock, joining the sidewall section to the advancing web of container stock, severing a portion of the container stock with the sidewall section joined thereto from the advancing web of container stock to form a container blank, and removing the scrap container stock from the container blank.

DETAILED DESCRIPTION OF PREFERRED EMBODIMENT AND METHODS

Figure 1:
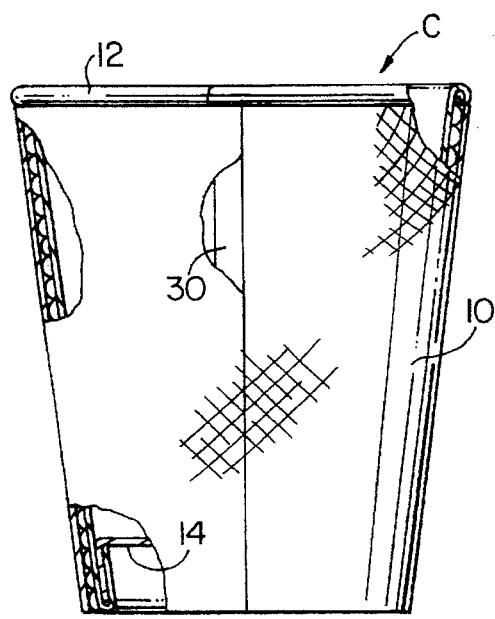
FIG. 1 is a side elevational view of a disposable insulated biodegradable cup made with an insulated container blank embodying the invention, portions of the cup sidewall shown broken away to reveal structure therebehind.

Referring now to the drawings, a disposable insulated biodegradable container or cup indicated generally by the letter C has a sidewall 10 made from a blank made in accordance with the invention and designated generally by the letter B. The cup C has a generally conventional appearance and includes a rolled lip 12 which surrounds the open upper end of the cup and a raised bottom wall 14 which facilitates nesting. The composite container blank B used to form the sidewall 10, and illustrated in further detail in FIGS. 2 and 3, comprises an inner layer of paper container stock 16 for forming the inner sidewall of the cup C and having an inner surface 18 which forms the inner surface of the cup C. A layer of insulating stock 20, preferably embossed paper, overlies and is joined to an associated portion of the outer surface of the container stock layer 16. The blank B further includes a layer of paper label stock 22 which overlies and is married to an associated portion of the outer surface of the insulating stock layer 20. The container stock, the insulating stock and the label stock layers have a common side edge 24. However, the label stock layer 22 and the insulating stock layer 20 together comprises an outer sidewall section indicated at 25 which has a somewhat smaller surface area than the container stock layer 16. The label stock layer 22 and the insulating stock layer 20 have common top and bottom edges and another common side edge spaced inwardly from the respectively associated top, bottom and side edges of the layer of container stock layer leaving three marginal portions of the outer surface of the container stock layer 16 exposed. The exposed upper marginal portion of the container stock layer, indicated at 26, comprises a lip area from which the cup lip 12 is ultimately formed. The exposed lower marginal portion of the container stock layer, indicated at 28, comprises a bottom area which cooperates in sealing engagement with a depending flange on the cup bottom wall 14 to retain and seal the bottom wall of the cup C. The exposed outer side marginal portion of the container stock layer, indicated at 30, forms the side seam of the cup C.

The insulating stock used to make the illustrated container blank B is embossed with a multiplicity of semi-domes which cooperate with the label stock and the container stock to form a multiplicity of air spaces therebetween. The finished blank B comprises a substantially flat structure particularly suited to be stacked within and fed from a magazine to a cup making machine by a suitable blank feeding mechanism such as a vacuum picker mechanism or the like, in a manner well known in the cup manufacturing art.

Figure 3:
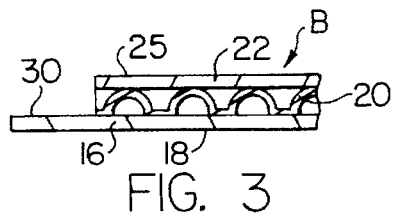
FIG. 3 is a sectional view taken along the line 3—3 of FIG. 2.
Figure 4:
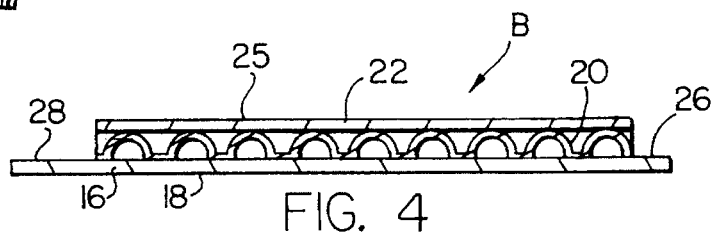
FIG. 4 is a fragmentary section view taken along the line 4—4 of FIG. 2.
Figure 2:
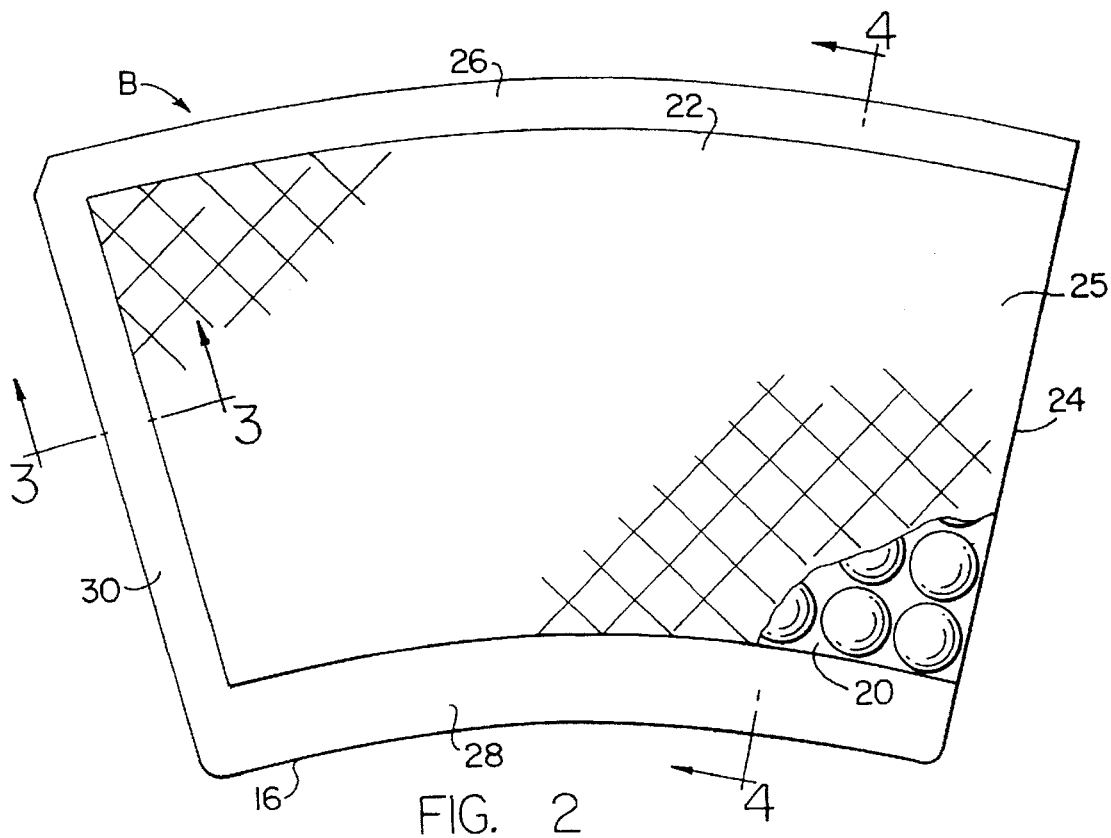
FIG. 2 is a somewhat enlarged plan view of an insulated container blank made in accordance with the present invention.
Figure 5:
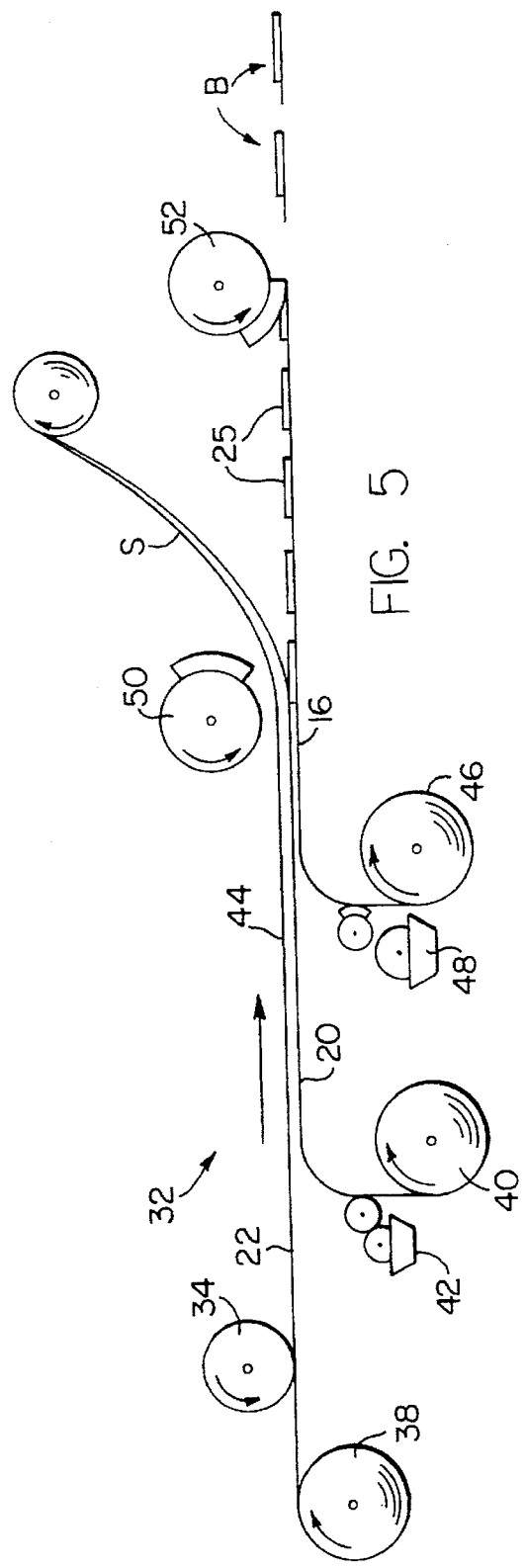
FIG. 5 is a somewhat schematic side elevational view of an apparatus for making the container blank shown in FIGS. 2–4 and illustrating steps in a method for making the container blank.

FIG. 5 schematically illustrates a presently preferred apparatus and method for making the composite insulated container blank B shown in FIGS. 2–4. The illustrated apparatus essentially comprises a modified label making machine indicated generally at 32 and which includes an associated printing apparatus 34.

As illustrated, a web of label stock 22 is fed from a payoff roll 38 and continuously advanced by a conventional feeding mechanism (not shown). The advancing web of label stock 22 passes through a printing station where the printing apparatus 34 applies a design, logo, or other information to the upper surface of the label stock. A web of insulating stock 20 fed from a payoff roll 40 is simultaneously advanced immediately below the advancing web of label stock. The upper surface of the advancing web of insulating stock 20 is married to the lower surface of the advancing web of label stock 22 by a full coating of adhesive or glue applied to the upper surface of the advancing insulating stock at a first gluing station 42, whereby an advancing web of laminate is formed and indicated by the reference numeral 44.

A web of container stock 16 fed from a payoff roll 46 is simultaneously continuously advanced immediately below the advancing web of laminate 44. A pattern coating of glue or other suitable adhesive is applied to the upper surface of the advancing web of container stock at a second gluing station 48 to join a predetermined portion of the bottom surface of the advancing web of laminate 44 to the top surface of the advancing web of container stock 16 thereby forming a three ply laminate which includes the container stock 16 the label stock 22 and the insulating stock 20 sandwiched therebetween. The aforedescribed three ply laminate is advanced through a die cutting station where a rotary cutting die 50 cuts a sidewall section 25 from the predetermined portion of the two ply laminate 44. More specifically, the rotary cutting die 50 cuts through only the two of the plies which include the label stock and the insulating stock leaving the sidewall section joined to the upper surface of the advancing web of container stock 16 which forms the third ply. Scrap material indicated by the letter S and produced by the first die cutting operation is separated from the sidewall section 25 which advances with the web of container stock 16 to which it is attached.

The advancing web of container stock 16 with the sidewall section 25 joined thereto passes through a second die cutting station where a rotary cutting die 52 severs the finished container blank B from the container stock 16.

The completed container blank B is used to form the sidewall of the cup C, shown in FIG. 1. The cup forming operation may be performed on a single wrap rotary turret cup making machine of a type well known in the container manufacturing art. Such a machine is illustrated and described in U.S. Pat. No. 3,289,552 to Corazzo, issued Dec. 6, 1966, and assigned to the assignee of the present invention. Thus, by preparing the cup blank B utilizing the continuous form manufacturing operation hereinbefore described, several material handling operations normally required to assembly the various elements which comprise a conventional cup of the multi-layer sidewall type may be eliminated whereby a container may be manufactured with a substantial saving in labor cost.

Figure 6:
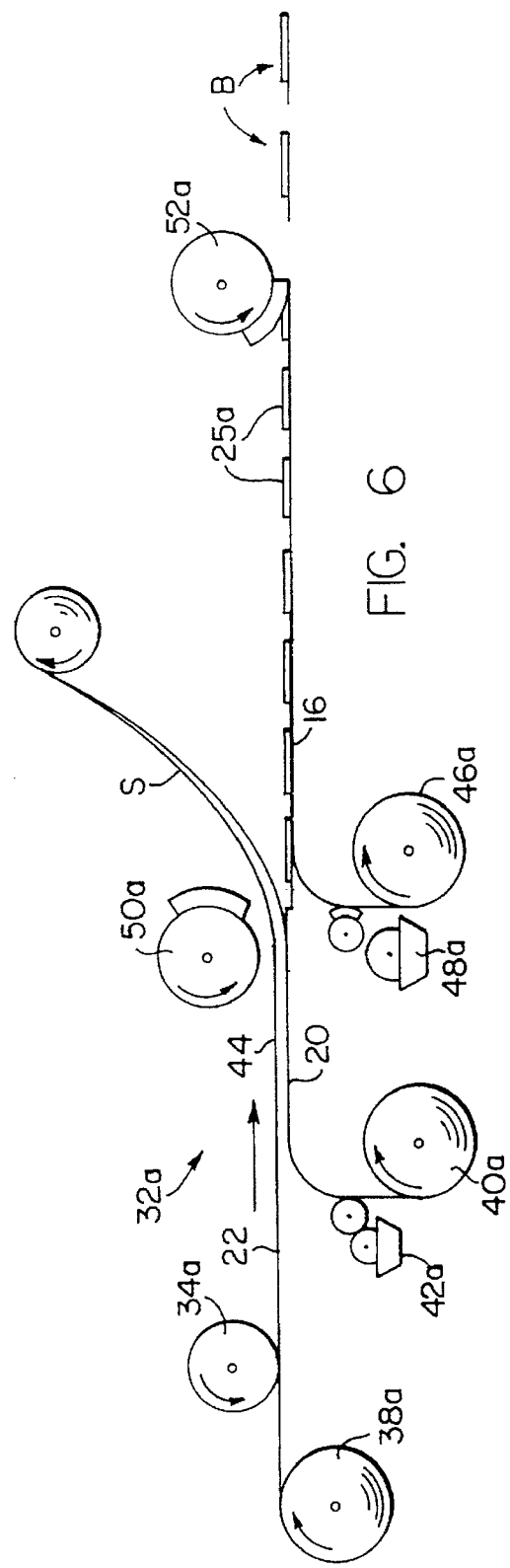
FIG. 6 is similar to FIG. 5 but illustrates another apparatus and method for making the container blank shown in FIGS. 1 and 2.

Referring now to FIG. 6, another apparatus, shown somewhat schematically and indicated at 32a illustrates another method of making the container blank B shown in FIGS. 2–4. Elements illustrated with respect to the apparatus 32a and which correspond to elements previously discussed bear the same reference numerals as the previously described elements and a letter a suffix.

As in the previously described apparatus and method, a web of label stock 22 and a web of insulating stock 20 are simultaneously advanced and married by a full coating of glue or other suitable adhesive material to form an advancing web of laminate 44.

The apparatus and method illustrated in FIG. 6 differs from the apparatus and method illustrated with reference to FIG. 5 in that the first rotary die cutting operation is performed on the advancing laminate 44 before the laminate is joined to the advancing web of container stock 16. The cutting operation separates only a portion of the sidewall section 25a from the laminate. The portions of the laminate 44 which are not separated from the sidewall section by the rotary die cutting apparatus 50a comprise tabs which connect each sidewall section to the next succeeding sidewall section formed by the cutting operation. Thus, the sidewall sections 25a, 25a remain in connected or continuous form for further advancement through the apparatus 32a.

After the first die cutting operation has been performed the scrap produced by this operation is separated from the partially formed sidewall section.

A full coating of adhesive is applied to the bottom surface of the advancing sidewall section 25a. The bottom surface of the partially formed sidewall section is then joined to a simultaneously advancing web of container stock 16.

The advancing web of container stock 16 with the partially formed sidewall section joined thereto passes through a second die cutting station where a rotary cutting die 52a severs the connecting tabs from the sidewall section and substantially simultaneously severs the finished container blank B from the web of advancing container stock 16. The finished container blank B may then be utilized in a conventional cup making machine to form the cup C, as hereinbefore discussed.

I claim:

1. A method for making a three ply insulated container blank comprising the steps of advancing a web of label stock, simultaneously advancing a web of insulating stock, marrying the lower surface of the advancing label stock to the upper surface of the advancing insulating stock to form and advancing web of two ply laminate, simultaneously advancing a web of container stock, adhering a patterned portion of the bottom surface of the advancing web of laminate to the top surface of said advancing web of container stock to form a three ply laminate, cutting at least a portion of a two ply outer sidewall section from the two ply laminate and including the patterned portion, separating from the outer sidewall section the scrap material produced by said cutting operation, severing from the advancing web of container stock an inner sidewall section having the outer sidewall section adhered thereto and defining a three ply container blank after the steps of adhering and cutting have been performed, and separating the container blank from the scrap material produced by the severing operation.

2. A method for making a insulated container blank as set forth in claim 1 wherein the step of cutting is further characterized as cutting an entire sidewall section from said two ply laminate and the step of cutting performed after the step of adhering has been performed.

3. A method for making an insulated container blank as set forth in claim 2 wherein the step of adhering is further characterized as applying a pattern coating of adhesive to one of the surfaces comprising the bottom surface and the top surface and adhering the patterned portion to the advancing web of container stock by said pattern coating.

4. A method for making an insulated container blank as set forth in claim 3 wherein the step of adhering is further characterized as applying the patter coating to the top surface.

5. A method for making an insulated container blank as set forth in claim 1 wherein the step of cutting is performed before the step of adhering.

6. A method for making an insulated container blank as set forth in claim 1, including the step of printing on said advancing web of label stock.

7. A method for making an insulated container blank as set forth in claim 6 wherein the step of printing is performed before the step of marrying the advancing web of label stock to the advancing web of insulating stock.

8. A method for making an insulated container blank as set forth in claim 1 wherein the step of cutting is further characterized as die cutting.

9. A method for making an insulated container as set forth in claim 8 wherein the step of die cutting is performed with a rotary die cutting apparatus.

10. A method for making an insulated container blank as set forth in claim 1, including the step of printing on said advancing web of label stock.

11. A method for making an insulated container as set forth in claim 10 wherein the step of printing is performed before the step of marrying the advancing web of label stock to the advancing web of insulating stock.

12. Method for making a three ply insulated container blank comprising the steps of advancing a web of label stock, simultaneously advancing a web of insulating stock, printing on the upper surface of the advancing insulating stock, marrying the lower surface of the advancing label stock to the upper surface of the advancing insulating stock to form and advancing web of two ply laminate after the step of printing has been performed, simultaneously advancing a web of container stock, applying a pattern coating of adhesive to the top surface of the advancing web of container stock, joining a patterned portion of the advancing web of two ply laminate to the advancing web of container stock by the pattern coating of adhesive, cutting a sidewall section from the two ply laminate, separating from the two ply sidewall section the scrap material produced by said cutting operation, severing a portion of the container stock having the two ply sidewall section joined thereto from the advancing web of container stock after the steps of joining and cutting have been performed to form a three ply container blank including the severed portion of the container stock and the two ply sidewall section joined thereto, and separating the container blank from the scrap material produced by the severing operation.

13. A method for making a three ply container blank comprising the steps of advancing a web of label stock, simultaneously advancing a web of insulating stock, marrying the advancing web of label stock to the advancing web of insulating stock to form an advancing full laminate, cutting at least a part of a sidewall section from the full laminate, separating the scrap produced by the sidewall section cutting operation from the sidewall section, simultaneously advancing a web of container stock, joining the sidewall section to the advancing web of container stock, severing a portion of the container stock with the sidewall section joined thereto from the advancing web of container stock to form a three ply container blank, and removing the scrap container stock from the container blank.

14. A method for making a three ply container blank as set forth in claim 13 wherein the steps of advancing are further characterized as continuously advancing.

\* \* \* \* \*